Aug. 7, 1928.
L. HAGEDORN
1,680,102
WINDSHIELD HEATER
Filed Oct. 18, 1927
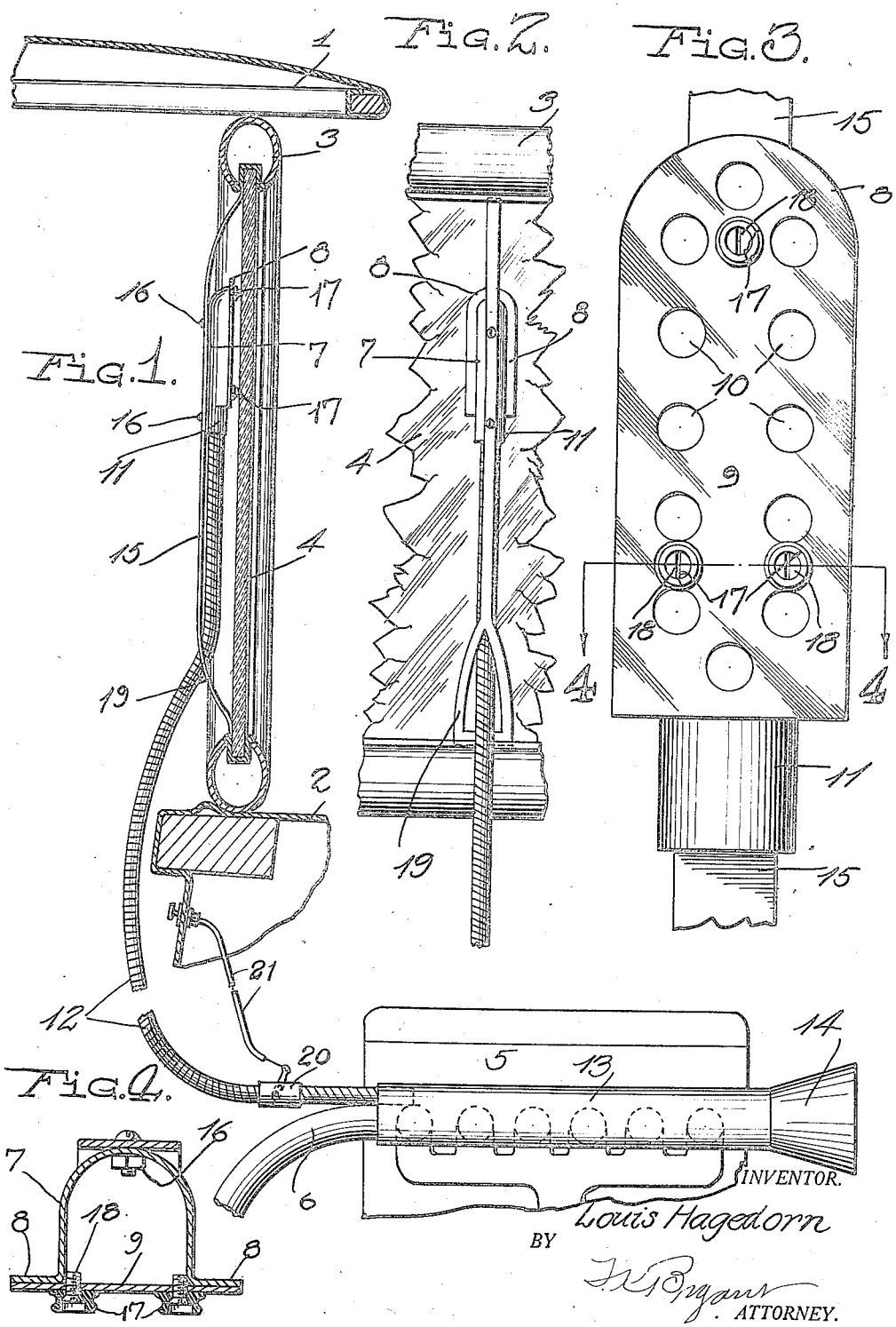
INVENTOR.
Louis Hagedorn
BY
ATTORNEY.

Patented Aug. 7, 1928.

1,680,102

UNITED STATES PATENT OFFICE.

LOUIS HAGEDORN, OF LUVERNE, MINNESOTA.

WINDSHIELD HEATER.

Application filed October 18, 1927. Serial No. 226,985.

This invention relates to certain new and useful improvements in windshield heater and more particularly to a heater device removably attached to the windshield of a motor vehicle for the purpose of preventing the accumulation of moisture, snow or ice upon the glass windshield and to insure clear vision through the windshield at all times.
A further object of the invention is to provide a heater attachment for the windshields of motor vehicles wherein the heater device is carried by a spring member that is removably and slidably associated with the windshield frame to permit the heater to be shifted transversely of the windshield in the desired direction for the proper distribution of heated air onto the windshield glass.

With the above and other objects in view that will appear as the nature of the invention is better understood, the same consists in the novel form, combination and arrangement of parts hereinafter more fully described, shown in the accompanying drawing and claimed.

In the accompanying drawing, wherein like reference characters indicate corresponding parts throughout the several views, Figure 1 fragmentarily illustrates the section, the windshield of a motor vehicle, a part of the top and body, together with the vehicle motor and showing the heater attachment in position on the windshield frame and in communication with an air heating chamber associated with the exhaust manifold of the motor;

Figure 2 is a fragmentary rear elevational view of the windshield frame with the heater in position;
Figure 3 is an enlarged front elevational view of the heater device; and Figure 4 is a cross-sectional view taken on line 4—4 of Figure 3 showing the air chamber of the heating device and the cushion blocks for spacing the heater from the windshield glass.

In Figure 1 there is illustrated the front end of the top of the motor vehicle designated by the reference numeral 1 and the cowl 2 with the windshield disposed between the top and cowl and comprising the usual tubular frame 3 that is grooved to receive the edges of and confine the windshield glass 4. The reference numeral 5 designates the vehicle motor with the exhaust pipe 6 directed rearwardly thereof.

The heater device is removably and slidably associated with the windshield frame 3 and the heated air flowing therefrom onto the windshield glass 4 is supplied by a flexible conduit that is in communication with a heating chamber associated with the exhaust pipe of the motor. The windshield heater comprises a casing or chamber of elongated formation having a rear curved wall 7 that is closed at its upper end and open at its lower end with outwardly directed edge flanges 8 as shown in Figures 2 and 4. A face plate 9 is placed in flat engagement with the edge flanges 8 and is permanently secured thereto in any manner, such as by soldering or the like. The face plate 9 is provided with a plurality of openings 10 as shown in Figure 3 for directing heated air onto the windshield glass 4.

The lower end of the rear curved wall 7 of the heater device is rolled into circular formation as at 11 for the attachment of one end of the flexible conduit 12. A tubular air heating chamber 13 is associated with the exhaust pipe 6 and has a funnel-shaped inlet 14 at its forward edge, the rear end of the tubular heating chamber 13 having the adjacent end of the flexible conduit 12 connected therewith. Air entering the tubular heating chamber 13 through the funnel-shaped opening 14 is heated by the exhaust pipe 6 and is delivered to the flexible conduit 12 to the heating device above described.

The heating device is carried by a member that is removably and adjustably mounted on the windshield frame 3 to permit the heating device to be moved over the windshield glass to the desired point. The supporting means for the heating device comprises a spirng member 15 having the heating device attached thereto as at 16 intermediate its ends while the opposite ends of the spring member are tapered and received between the frame 3 and glass 4. The spring member 15 is of a length to be placed under tension when engaged with opposite sides of the windshield frame 3, and is also of a length that when so engaged, the heater device will contact the windshield glass 4. To space the heater device from the glass so that heated air may pass through the opening 10 and onto said glass, the face plate 9 of the heater device carries cushion blocks 17 projecting outwardly from the face of said plate and attached thereto by screw studs 18.

The cushion blocks 17 hold the heating device spaced from the windshield glass so that air may flow through the openings 10 and onto the glass 4 for heating the same. The heater device may be shifted transversely of the windshield frame with the spring member 15 retaining the same in position on the windshield frame and also in its shifted position. When the heater is out of use, the same may be shifted to one side of the windshield, or disengaged therefrom. As shown in Figures 1 and 2, the lower end of the spring member 15 that carries the heater device is formed with a loop portion 19 through which the flexible conduit 12 extends, the flexible conduit after passing through the loop 19 being positioned between the spring member 15 and the windshield glass 4. The spring member and heater device may remain engaged with the windshield frame and the flexible conduit 12 disengaged therefrom. The conduit 12 may remain engaged with the heater device and communication between the heater device and heating chamber 13 shut off. This operation is accomplished by the valve device 20 mounted in the flexible conduit 12 and controlled by the pull rod 21 similar to the operating device for the choke valve.

From the above detailed description of the invention, it is believed that the construction and operation thereof will at once be apparent, and while there is herein shown and described the preferred embodiment of the invention it is nevertheless to be understood that minor changes may be made therein without departing from the spirit and scope of the invention as claimed.

What I claim as new is:—

In a windshield heater for motor vehicles, the combination with the windshield frame, of a spring member detachably engaged at its ends with the frame, a heater device carried by the spring member, the heater device comprising a casing having openings in one wall directed toward the windshield glass, a flexible conduit attached to the heater, and an air heating chamber associated with the motor exhaust pipe and having the flexible conduit attached thereto.

In testimony whereof I affix my signature.

LOUIS HAGEDORN.